United States Patent [19]

Hansson

[11] Patent Number: 5,053,586
[45] Date of Patent: Oct. 1, 1991

[54] REEL ASSEMBLY WITH A FLEXIBLE BRAKE CORD FOR ARRESTING OR SLOWING REEL ROTATION

[75] Inventor: Gunnar C. Hansson, Stockholm, Sweden

[73] Assignee: Atlas Copco Tools Aktiebolag, Stockholm, Sweden

[21] Appl. No.: 544,664

[22] Filed: Jun. 27, 1990

[30] Foreign Application Priority Data

Jul. 10, 1989 [SE] Sweden ............................... 8902476

[51] Int. Cl.⁵ ........................................... H02G 11/02
[52] U.S. Cl. ............................. 191/12.2 R; 242/107.3; 242/107.6
[58] Field of Search ...................... 191/12.2 R, 12.2 A, 191/12.4; 242/107.3, 107.6, 107.7

[56] References Cited

U.S. PATENT DOCUMENTS

| | | | |
|---|---|---|---|
| 2,526,256 | 10/1950 | Mihara | 242/107.6 |
| 2,996,584 | 8/1961 | Roark | 191/12.2 R |
| 3,032,291 | 5/1962 | Kendt et al. | 191/12.2 R X |
| 3,061,234 | 10/1962 | Morey | 242/107.7 X |
| 3,657,491 | 4/1972 | Ryder et al. | 191/12.2 R X |
| 3,821,496 | 6/1974 | Malone | 191/12.2 R |
| 3,942,738 | 3/1976 | Rutty | 242/107.3 X |
| 4,473,197 | 9/1984 | Yach | 191/12.2 R X |
| 4,489,261 | 12/1984 | Hartwig et al. | 318/700 |
| 4,735,377 | 4/1988 | Zuehsow | 191/12.2 R X |

Primary Examiner—Robert J. Spar
Assistant Examiner—Scott L. Lowe
Attorney, Agent, or Firm—Frishauf, Holtz, Goodman & Woodward

[57] ABSTRACT

An electrical cable (20) is wrapped on and can be unwound from a reel (34) rotatable in unison with a brake drum (33) on a support (13,27). A clock spring (32) on the support (13,27) constantly urges the reel (34) to rewind the cable (20). A brake cord (36) fixed to the support (13,27) is wrapped in the rewind direction around the drum (33) and connected via a train of chain links (A,B,c) to a spring (41) that tensions the cord (36) to act as a frictional one way clutch against the drum (33) to hinder rewinding in any selected unwound position of the cable (20). To release clutch action, a further train of chain links (C,D,E) is interposed between the spring (41) and a control connection (45), by pulling of which the tension of spring (41) can be relieved to allow rewinding. A still further train of chain links (A,F,G) is connected to the cord (36) and to spring and buffer (53,55,21,60), adapted to re-tension the cord (36) momentarily for braking action in response to the cable (20) reaching fully rewound position defined by an abutment (61) on the cable (20) actuating the spring and buffer.

9 Claims, 3 Drawing Sheets

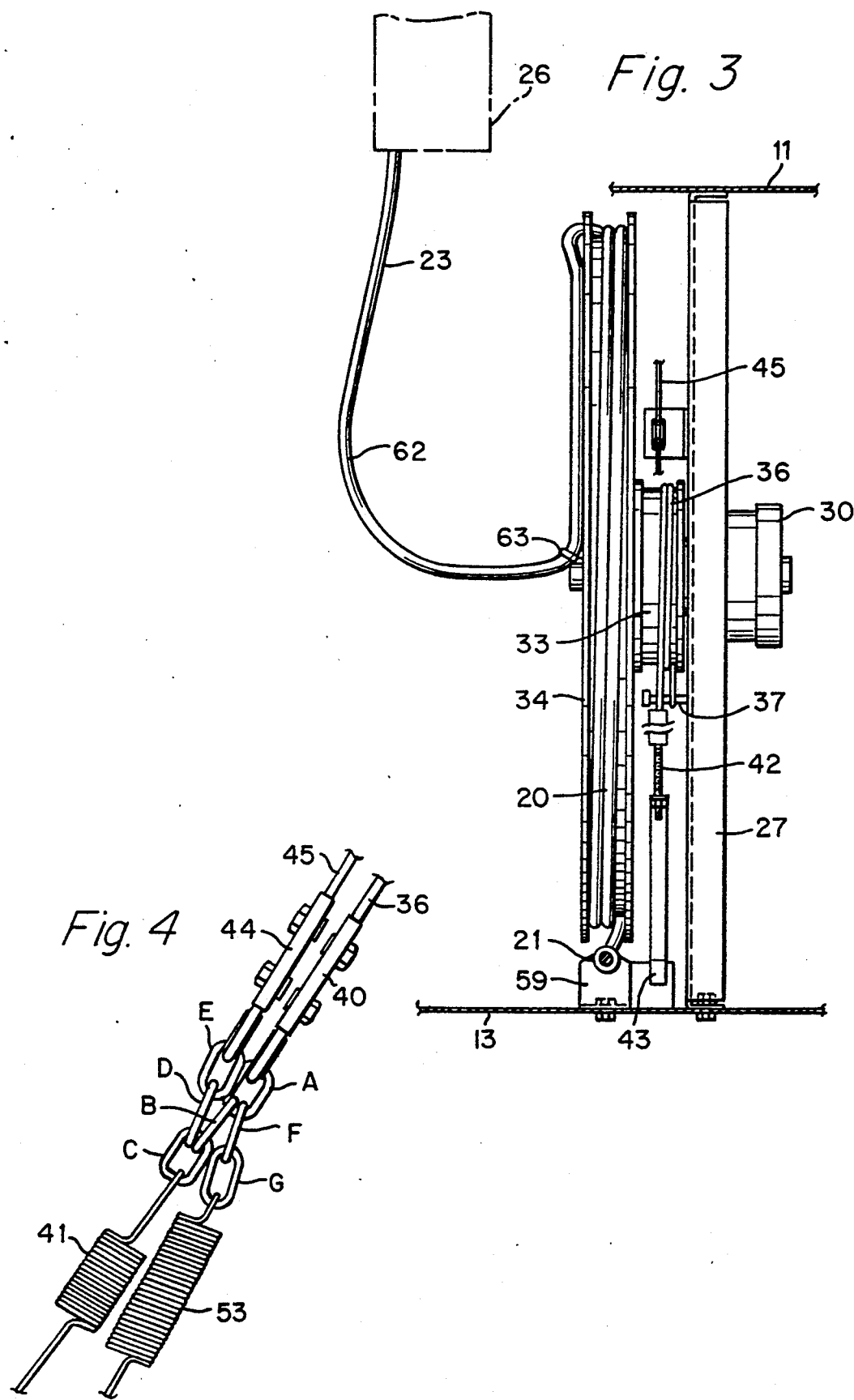

REEL ASSEMBLY WITH A FLEXIBLE BRAKE CORD FOR ARRESTING OR SLOWING REEL ROTATION

This invention relates to a reel assembly, and more particularly to an improved reel assembly for electrical conductors of the type adapted for unwinding or pay-out of a conductor cable from a reel against the action of a re-winding bias, and wherein releasable means are provided for automatically arresting the cable in its unwound position.

Reels of the above type are normally associated with electrically driven movable or hand held machines or tools with the reel assembly cable connected in power transmitting relation between the machine and a fixed supply point. Power is thereby conveniently transmitted to the machine during its movements and in any working position selected therefor by the operator within the limits dictated by the length of the cable.

In conventional such reels arresting of the cable is often realized by gripping the cable frictionally. This repeated strain and wear of the cable is undesirable particularly in use of multiconductor cables containing thin control wiring tightly packed to extend therein together with the supply leads. In alternative solutions ratchet mechanisms have been used for the arresting but their repeated more or less jerky stopping movements are likewise liable to put undue strain on the cables.

It is therefore an object of the invention to provide in a reel assembly of the above type novel and improved means for automatic smooth arresting of the cable in any selected unwound position.

Another object of the invention is to attain such arresting by means operating in the mode of a frictional one-way clutch.

A further object of the invention is to associate the frictional arresting means with an adjustable release mechanism adapted to reduce the frictional action of said arresting means sufficiently to overtake the one-way action and to allow rewinding of the cable at a controlled moderate speed.

A still further object of the invention is to re-apply the full frictional action of the arresting means shortly before the released cable has been fully re-wound in order to suppress by braking accumulated momentum of the rotating parts of the reel assembly sufficiently to bring the moving cable gently to rest.

The above objects are attained by the invention defined in the appended claims.

The invention is described hereinafter with reference to an embodiment thereof illustrated in the drawings, in which FIG. 1 is a perspective view of a working stand with a diagrammatic illustration of the inventive reel assembly as regards its general disposition in the stand;

FIG. 3 is a front view of the reel in FIG. 2 with the front cover of the fragmentarily indicated stand removed;

FIG. 4 is an enlarged view of a detail in FIG. 2; and

Figure 1:
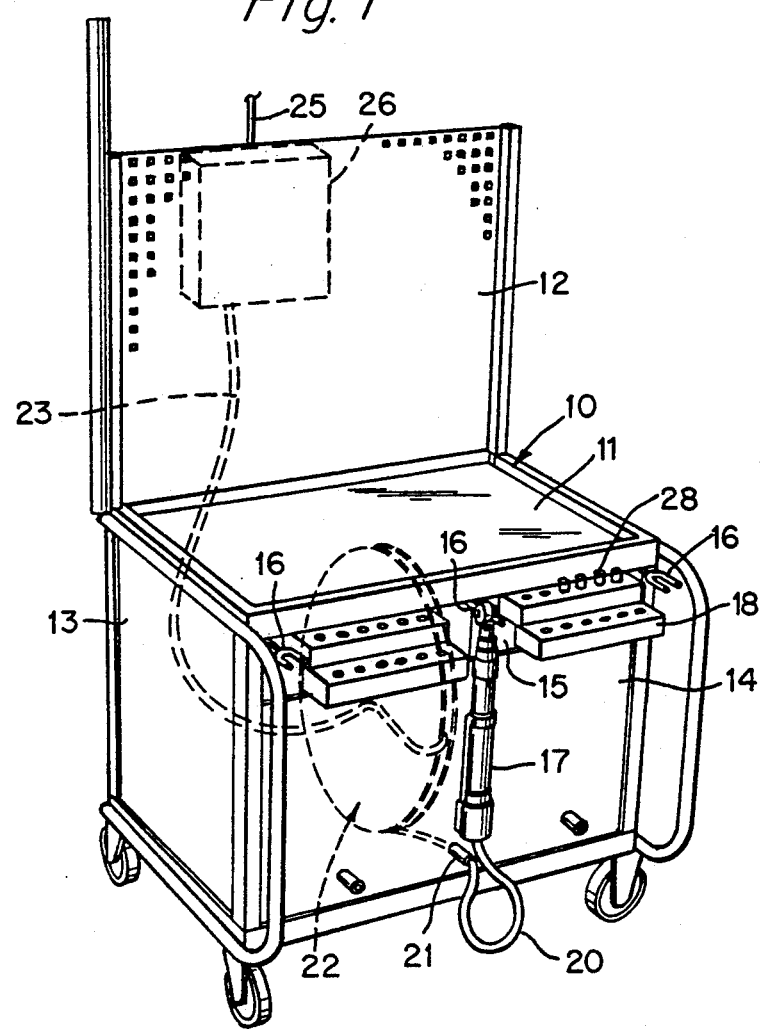

FIG. 1 illustrates a wheeled working stand 10 with a table 11, an upwardly extending instrument supporting panel 12 at the rear of the table 11, and a cabinet 13 covered by the table 11. The cabinet 13 has a front cover 14 with an elongated upper aperture 15 through which projects a suitable number of forked suspension levers 16, of which three are shown in FIG. 3. These levers are as shown intended for suspending in an idle position electrically driven hand tools 17, of which one is shown in FIG. 1 hanging in the fork of the middle lever 16. From the aperture 15 between the levers 16 there project shelves 18 affixed to the underside of the table 11.

The hand tool 17 has a flexible power supply cable 20 connected thereto which extends into the cabinet 13 via an outlet sleeve 21 and is wrapped on a reel assembly, diagrammatically indicated in FIG. 1 by numeral 22. Subsequent to the wrapping the cable 20 has a continuation 23 connected to a drive unit 26 fixed to the rear of the panel 12, the unit 26 in its turn being supplied with electric power from the mains by a flexible cable 25.

The working stand 10 is to be used for example in the automotive industry as a power supply and tool supporting post in connection with work on an assembly line, wherein one or more operators perform a number of different sequential operations on the work serviced by the stand. In the example the tool 17 is shown as being a nutrunner electrically powered by the electronic drive unit 26 consisting of a solid state converter. An arrangement of that type is disclosed for example in U.S. Pat. specification No. 4,489,261 and the drive converter 26 is preferably of the type retailed by Atlas Copco AB, Sweden, under the trade mark TENSOR. The tool may be used with a set of alternative fastener engaging members such as socket wrenches 28 of which one is shown on one of the shelves 18. Suitable control leads are included in the cables 20 and 23 between the tool 17 and its drive unit 26 so as to enable control and drive of the tool as may be desired. Control is also possible in a way to adapt the driving power automatically to the demand variation dictated by the work to be performed by the dimension of the particular wrench 28 selected by the operator to be placed on the tool 17, one possible mode of such operation being disclosed in more detail in pending Swedish patent application 8802566-3, filed on July 8, 1988.

Figure 5:
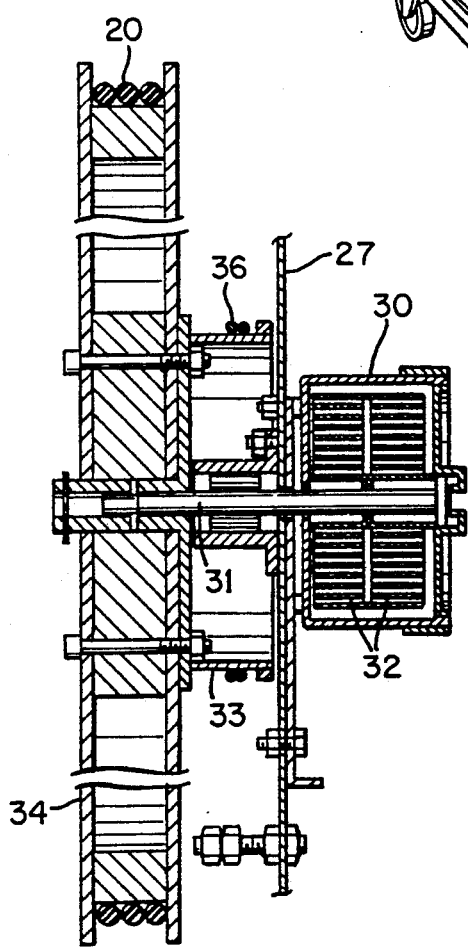
FIG. 5 is a sectional view on the line 5—5 in FIG. 2.
Figure 2:
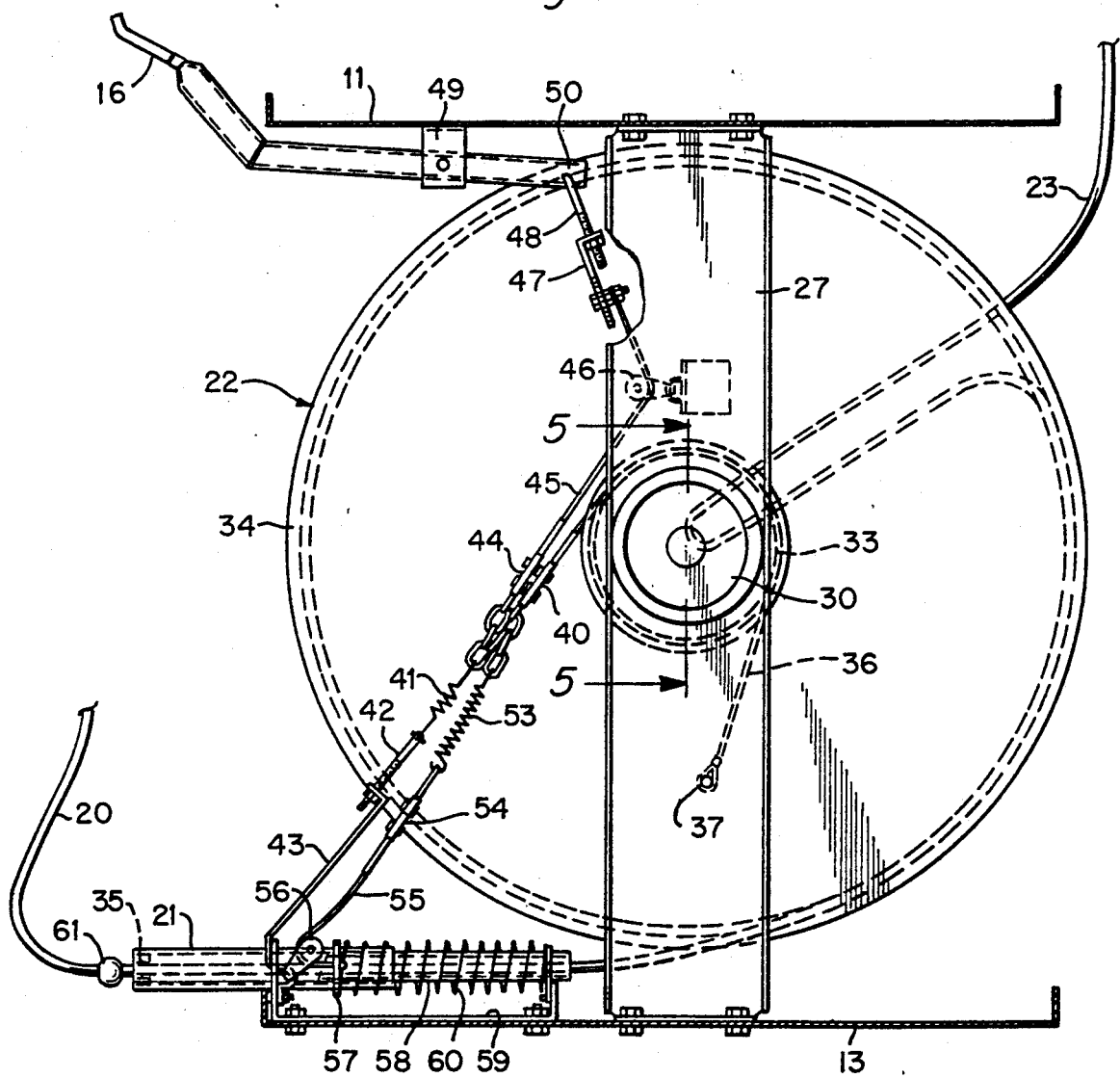
FIG. 2 is an enlarged side view of the reel assembly in FIG. 1 disposed within the stand.

In FIGS. 2 and 3 a bracket 27 is affixed between the table 11 and the bottom of the cabinet 13 and carries a spring housing 30 centrally thereon. In the housing 30 and the bracket 27 is journalled a shaft 31, FIG. 5, and a set of spiral or clock springs 32 in the housing 30 is biased between the shaft 31 and the housing 30 so as to urge the latter, together with a drum 33 and a reel 34 carried thereby, to rotate in the counter clockwise or rewind direction when viewed in FIG. 2.

The power supply cable 20 is wrapped upon the reel 34 and is extensible through the aperture 35 of the outlet sleeve 21 so as to rotate the reel 34 in the pay-out or clock-wise direction when viewed in FIG. 2.

An elongated flexible brake element, preferably a cord 36 of wear resistant frictionally effective material, for example the material retailed by Du Pont, U.S.A., under the trade name KEVLAR, is fixedly connected to the bracket 27 at pin 37 and then wrapped around the drum 33 at least one or two full windings in the rewind direction, i.e. counter-clockwise when viewed in FIG. 2. The other end of the cord 36 is after the wrappings thereof coupled via a connector 40 to a train of preferably three movably interconnected chain links A,B,C, FIG. 4. The link C is coupled to biasing means such as a helical spring 41 connected to a set screw and nut unit 42 which is supported by a bracket 43 fixed to the forward bottom portion of the cabinet 13. By axial adjustment of the screw 42 relative to the bracket 43 the bias of the spring 41 can be adjusted at will to provide the desired frictional action of the cord 36 against the drum 33.

Two more chain links D,E form together with link C a second train of chain links C,D,E connecting the spring 41 via a connector 44 to a flexible line or wire 45. The line 45 is drawn over a small sheave 46 fixed to the bracket 27 on to adjusting means consisting of an angle piece 47 fixed in axially stepwise selectable relation to the line 45 and carrying, likewise in axially adjustable relation, a set screw and nut unit 48. The forked lever 16 mentioned in the beginning of this description is pivotally supported in a bracket 49 on the underside of the table 11 and is at an inner end at 50 pivotally connected to the set screw unit 48. The adjustment of the cord 45 by the unit 48 and piece 47 will be chosen such that the lever is kept in its upward inactive position shown in FIG. 2 with line 45 and link train C,D,E stretched without, however, weakening the desired braking bias of the spring 41 acting through the link train C,B,A on drum 33.

Two further intercoupled chain links F,G form together with link A a third train of chain links A,F,G with link G connected to a helical spring 53 hooked to a connector 54. A flexible line 55 is attached to the connector 54 and extends in normally unstretched or slacked state over a small sheave 56 on to a fixation point on a flange 57 provided on the inner end of the outlet sleeve 21 through which the cable 20 extends after having passed through a tubular guide 58. The sleeve 21 is slidably guided in a bore in the upstanding forward limb of a U-shaped bracket 59 and is also slidable on the guide tube 58, the latter being fixed to the rear limb of the bracket 59. A buffer spring 60 is inserted around the tube 58 between the flange 57 and the rear limb of bracket 59. The sheave 56 is supported by the forward limb of bracket 59. A buffer plug 61 is attached to the cable 20 at a suitable distance not far from its terminal tool end and is intended for abutting cooperation with the sleeve 21 as will be described hereinafter.

In order to avoid the complication of slip rings in the power transmission between the power unit 26 and the cable portion 20 wrapped to rotate with the reel 34, the full length of the cable from unit 26 to tool 17 is left undivided. The cable portion 23 connected to the unit 26 is given some extra length to form a loop 62, FIG. 3, before being fixed at 63 to near the center of the reel 34 and then continued radially to the rim of the reel 34 to join the reeled portion of cable 20. The chosen relation between the diameter of the reel 34 and the length of the loop 62 is such as to assure that by gentle twisting the portion 23 will be able to take up the number of reel turns necessary for attaining the desired tool working range without putting undue strain on the cable wiring.

The operator firstly connects the tool 17 to drive the particular wrench 28 from the shelves 18 that he needs for the operation to be performed. During work then, while the operator keeps the tool 17 in his hands and moves about and actuates the drive from the tool, the parts of the reel assembly 22 will take the position shown in FIG. 2. The clock spring 32 within the housing 30 provides a constantly acting first bias tending to rewind the cable 20 and to wrap it on the reel 34. The second bias provided by the spring 41, however, will prevent such movement since it via the link train C,B,A keeps the cord 36 stretched and creates, due to the chosen direction of the wrappings, an increasing frictional braking grip of the cord 36 against the drum 33 counteracting any tendency of the reel 34 to rotate due to said first bias. The operator will be unhindered to extend and unwind the cable 20 as desired at any time, rotation in that sense evidently acting to loosen the brake cord wrappings. It is thus realized that cord 36 and drum 33 jointly provide the function of a one way clutch by which the reel 34 is enabled to free-wheel during unwinding on pulling of the cable 20 and is promptly arrested at the release thereof.

The moment the operator decides to put the tool 17 aside by hanging it in the fork of lever 16, the weight of the tool will pivot the lever to actuated position wherein its end 50 pulls the cord 45 upward to take over the bias of spring 41 via the link train E,D,C, . That relieves link train C,B,A and the stretching and braking action of cord 36 is lessened or removed. As a result, the constantly acting first bias of the clock springs 32 is freed to rotate the reel 34 and starts rewinding the cable 20. Build up of excessive rotative speed and momentum may be prevented by adjusting elements 47,48, and 42 to relieve the bias from spring 41 to become only partial in the sense that sufficient bias is left to cause suitable gentle braking of drum 33 by cord 36. During rewinding the buffer plug 61 on cable 20 finally will reach aperture 35 and starts pushing sleeve 21 inward into cabinet 13. This causes flange 57 on sleeve 21 to compress buffer spring 60 and to simultaneously tighten the flexible line 55 whereby spring 53 is tensioned and exerts via chain link train G,F,A a braking bias on cord 36 sufficient to consume the momentum of the rotating reel assembly parts and to smoothly stop the reel 34. Thereupon spring 60 will push back sleeve 21 to its starting position under slight payout of cable 20 and relief of spring 53.

It is realized that effective independent control of the action of springs 41 and 53 alternately on cord 36 is made possible in a mechanically simple way thanks to the chain link trains A,B,C; E,D,C and G,F,A and the ability of the intermediate links B and F thereof to provide the necessary slack between the trains at actuation.

The invention is not limited to the described example but can be varied in many ways within the scope of the appended claims.

I claim:

1. A reel assembly (22) comprising a support (13,27), a winding reel (34) rotatably mounted on said support (13,27), a brake drum (33) coaxially affixed to said reel (34), a flexible conductor cable (20) wrapped upon said reel (34) and extensible therefrom so as to rotate said drum and reel in a pay-out direction, a first biasing means (32) connected between said support (13,27) and said drum (33) and reel (34) for urging them to rotate in a rewind direction opposite said pay-out direction an elongated flexible brake element (36) fixedly connected at one end (37) thereof to said support (13,27) and wrapped on said drum (33), second biasing means (41) connected between said support (13,27) and the other end of said brake element (36) to tighten said brake element (36) frictionally around said drum (33) so as to arrest rotation of said drum and reel in said rewind direction while permitting them to rotate in said pay-out direction during which said drum tends to frictionally slide relative to said brake element (36), and means to relieve said second biasing means (41) so as to free rewinding rotation of said drum and reel in response to said first biasing means (32).

2. A reel assembly according to claim 1, wherein said flexible brake element comprises a cord (36) helically wrapped in at least one full winding around said drum (33), said first biasing means comprises a clock type first spring (32), and said second biasing means comprises a helical second spring (41).

3. A reel assembly according to claim 1 wherein said flexible brake element comprises a cord (36) wrapped around said drum (33), said second biasing means comprises a second spring (41), and said relieving means comprises a control connection (45) provided on said support (13,27) actuatable to reduce the tightening bias of said second spring (41) on said brake element (36).

4. A reel assembly according to claim 3, wherein said control connection comprises a flexible line (45) connected to said second spring (41) and to a lever (16) provided on said support (13,27) to pivot between an inactive and an actuated position and adapted, to tension in said actuated position thereof said second spring (41) via said line (45) so as to reduce its bias on said braking cord (36).

5. A reel assembly according to claim 4, wherein a terminal end of said conductor cable (20) is connected in power transmitting relation to a hand tool (17), said lever being adapted to take actuated position in response to said hand tool (17) being suspended on said lever (16).

6. A reel assembly according to claim 2, wherein a sleeve (21) is provided on said support (13,27) through which said cable (20) is extended from said reel (34), an abutment plug (61) being provided near an outer terminal end of said cable (20) for cooperation with said sleeve (21), and buffer spring means (60) between said support (13,27) and said sleeve (21) for resiliently arresting movement thereof and rewinding movement of said cable (20) when said plug (61) abuts said sleeve (21).

7. A reel assembly according to claim 6, wherein a helical third spring (53) is connected to the end of said brake cord (36) adjacent to said second spring (41), and a further flexible line (55) is provided between said sleeve (21) and said third spring (53) for tensioning said third spring (53) to provide a braking bias on said cord (36) in response to arresting movement of said sleeve (21).

8. A reel assembly according to claim 7, wherein a first (A,B,C) and third (A,F,G) train of chain links is interposed between said second (41) and third (53) spring on the one hand and said brake cord (36) on the other for enabling said springs (41,53) alternately to bias said brake cord (36) at tensioning and relief of said third spring (53).

9. A reel assembly according to claim 4, wherein a first train (A,B,C) of chain links is interposed between said second spring (41) and said brake cord (36), and a second train (E,D,C) of chain links is interposed between said control connection (45) and said second spring (41) for enabling said spring (41) alternately to bias and to relieve said brake cord (36) in response to said lever (16) taking inactive and actuated position, respectively.

* * * * *